US006543310B1

United States Patent
Baker et al.

(10) Patent No.: US 6,543,310 B1
(45) Date of Patent: Apr. 8, 2003

(54) BICYCLE PEDAL CLIP AND MOUNTING APPARATUS

(76) Inventors: Thomas Baker, 4000 Davana Rd., Sherman Oaks, CA (US) 91423; Joseph A. Bravo, 12776 Norris Ave., Sylmar, CA (US) 91342

(*) Notice: Subject to any disclaimer, the term of this patent is extended or adjusted under 35 U.S.C. 154(b) by 0 days.

(21) Appl. No.: 09/825,372

(22) Filed: Apr. 2, 2001

Related U.S. Application Data

(60) Provisional application No. 60/193,254, filed on Apr. 3, 2000.

(51) Int. Cl.[7] .................................................. G05G 1/14
(52) U.S. Cl. ..................................... 74/594.6; 74/594.4
(58) Field of Search ............................ 74/594.4, 594.6; 36/131

(56) References Cited

U.S. PATENT DOCUMENTS

| | | | | | |
|---|---|---|---|---|---|
| 4,089,236 A | * | 5/1978 | Genzling | .................... | 74/594.4 |
| 4,599,915 A | * | 7/1986 | Hlavac et al. | .............. | 74/594.4 |
| 4,622,863 A | * | 11/1986 | Denker | ...................... | 74/594.6 |
| 4,716,784 A | * | 1/1988 | Schlotterer | ................. | 74/594.6 |
| 4,738,158 A | * | 4/1988 | Christol | ..................... | 36/131 X |
| 4,916,972 A | * | 4/1990 | DeMartin | .................. | 74/594.6 |
| 4,932,287 A | * | 6/1990 | Ramos | ...................... | 36/131 X |
| 5,199,324 A | * | 4/1993 | Sain | .......................... | 36/131 X |
| 5,423,233 A | * | 6/1995 | Peyre et al. | ................ | 74/594.6 |
| 5,546,829 A | * | 8/1996 | Bryne | ....................... | 74/594.6 |
| 5,704,256 A | * | 1/1998 | De Lattre | .................. | 36/131 X |
| 5,852,955 A | * | 12/1998 | Crisick et al. | ............. | 74/594.6 |
| 6,076,427 A | * | 6/2000 | Nutto et al. | ................ | 74/594.6 |

FOREIGN PATENT DOCUMENTS

| | | | | | |
|---|---|---|---|---|---|
| DE | 3602329 A1 | * | 7/1987 | ................ | 74/594.6 |
| DE | 3924601 A1 | * | 1/1991 | ................ | 74/594.6 |
| WO | WO 88/04802 | * | 6/1988 | ................ | 74/594.6 |
| WO | WO 89/06619 | * | 7/1989 | ................ | 74/594.6 |

* cited by examiner

*Primary Examiner*—Vinh T. Luong
(74) *Attorney, Agent, or Firm*—Roger A. Marrs

(57) ABSTRACT

A quick connect and disconnect mechanism for releasably engaging a cyclist's shoe with a bike pedal having a slotted retainer secured to the pedal and an insert secured to the sole of the cyclist's shoe. The insert or key is insertably introduced through an open end of the slot to engage the retainer. A wedge and dove-tail arrangement prevents separation of the insert or key from the retainer in a direction normal to the pedal. A resilient detent construction yieldably or releasably holds the insert or key in the slot of the retainer and permits only lateral separation. A guide or alignment arrangement is employed to conduct the insert or key into the slot via the open end thereof.

2 Claims, 3 Drawing Sheets

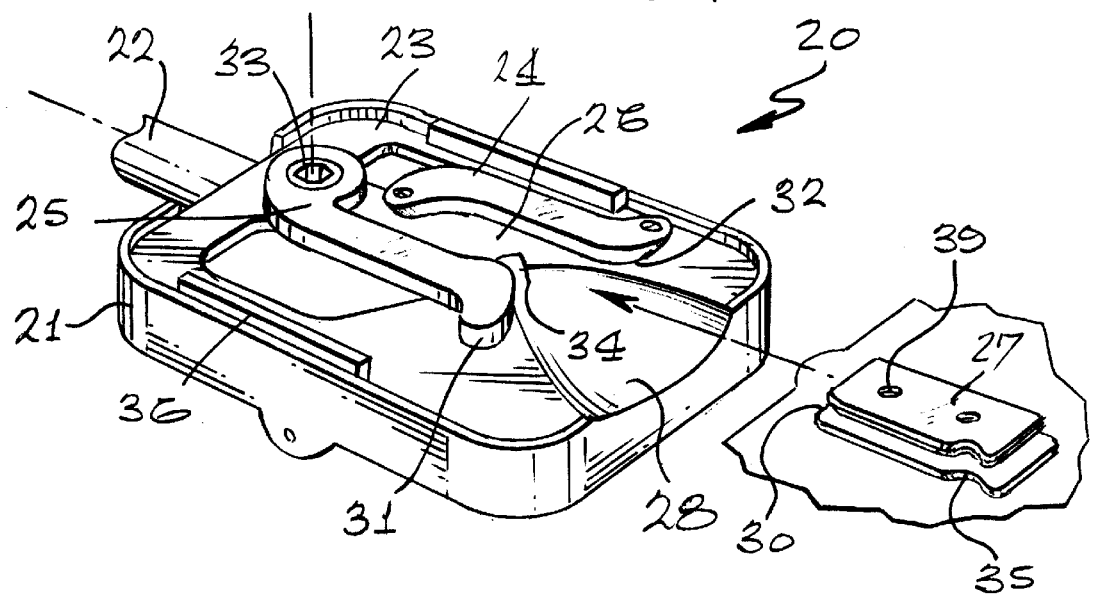
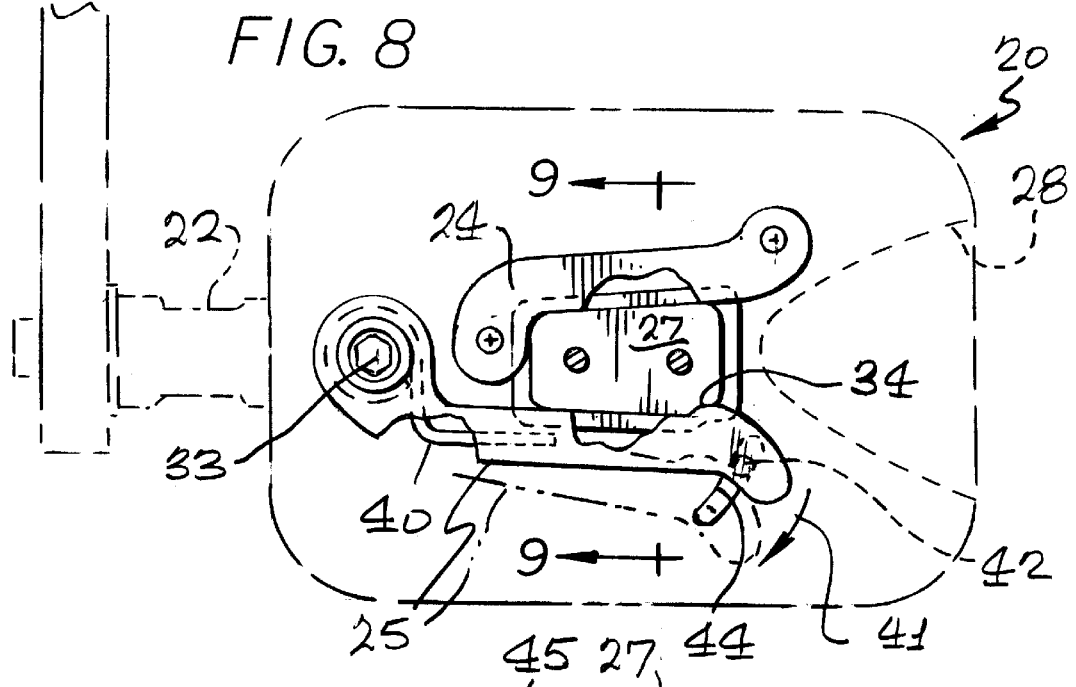
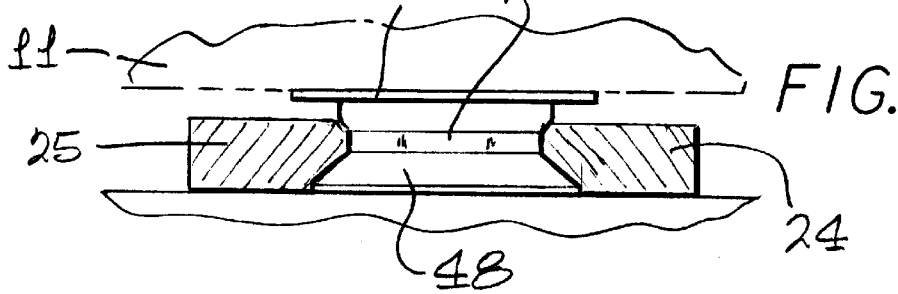

BICYCLE PEDAL CLIP AND MOUNTING APPARATUS

This application claims the benefit of Provisional application Ser. No. 60/193,254 filed Apr. 3, 2000.

BACKGROUND OF THE INVENTION

1. Field of the Invention

The present invention relates to the field of bicycle pedals, and more particularly to a novel pedal mounting which incorporates a shoe clip and slotted receiver on the pedal that provides safety and convenience for a quick and easy insertion or extraction of the cyclist's shoe into and out of the pedal.

2. Brief Description of the Prior Art

In the past, it has been the conventional problem for cyclists to quickly and conveniently place their foot on the pedals of a bicycle in a safe and convenient manner. Problems and difficulties have been encountered with conventional engagement of a cyclist's shoes on the pedals which stem largely from the fact that no positive or releasable connection is provided between the shoe and the pedal. The unattached shoe may readily slip from the pedal. Attachment of the shoes to the pedal is dangerous in the case of the rider falling or separating from the pedals during an accident.

Other difficulties and problems have been encountered when employing conventional toe guards or clips in combination with the pedal to retain a shoe on a pedal since conventional toe guards permit insertion and withdrawal of the toe portion of a cyclist's foot only through an exposed opening at the rear of the guard. Therefore, a cyclist mounting or boarding a bicycle must carefully place the shoe tip into the rear opening of the guard so that the toe portion of the foot may enter the internal cavity of the guard while the bottom of the foot presses against the pedal. Difficulties involving safety are encountered with conventional shoe retainers since both sides of the guard have sidewalls or a framework which completely encircles the midsection of the cyclist's shoe, leaving only the rear entrance or opening for insertion or removal of the foot from the guard. In an emergency, it is difficult to remove one's foot from such a conventional toe guard or unreleasable clip and because of this difficulty, injury can occur.

Therefore, a long-standing need has existed to provide a novel pedal mounting for a cyclist's shoe which not only assists in maintaining the pedal level but will provide improved power characteristics and which will employ releasable shoe clip and pedal retainer means for quick insertion or removal of the cyclist's foot or shoe into and out of the retainer.

SUMMARY OF THE INVENTION

Accordingly, the above problems and difficulties are avoided by the present invention which provides a novel shoe-to-pedal mounting or releasable retaining means incorporating a wedge clip secured to the underside or sole of a cyclist's shoe that is insertably introduced to a slot in a retainer secured to the surface of a pedal. The retainer includes a guide means for aligning the wedge clip into an entrance opening leading into the slot. The respective side surfaces of the slot and the clip are mated to prevent dislodgement or separation of the shoe in a direction normal to the pedal. However, separation is available laterally in the instance of the rider leaving the bicycle.

The retainer includes a spring loaded yieldable means for releasably securing the clip with the retainer. This means has at least one spring biased sidewall in connection with a detent carried on the clip. Therefore, a cyclist may insert or extract his shoed foot into or out of the pedal for desired bicycle operating purposes or for separation from the pedal in order to avoid injury during accidental or unusual circumstances. Rapidity of insertion and removal of the clip from the retainer is extremely important to racing enthusiasts as well as the safety and convenience of non-racing personnel.

Therefore, a primary object of the present invention is to provide a quick release mechanism operable between a cyclist's shoe and a pedal, providing releasable coupling of a shoe with the pedal for improved operating procedures as well as for safety purposes.

Another object resides in providing a releasable retaining means between a cyclist's shoe and a pedal which is simple to install and which is suitable for both road or mountain biking.

Still another object of the present invention is to provide a bicycle pedal mounting device for releasably connecting a cyclist's shoe to a pedal for convenient access thereto by the cyclist and which provides a smoother ride with safety and convenience for quick and easy insertion and extraction of the cyclist's shoe with respect to a pedal retainer or clamp.

A further object resides in providing a bicycle pedal or shoe mounting arrangement which avoids potential cyclist's fall and injury when rapidly inserting or extracting of the cyclist's shoe from a pedal retaining means.

A further object resides in providing an adjustable and releasable means for a cyclist's shoe with respect to a pedal of a bicycle so as to provide automatic or intentional release of the shoe from securement with the pedal.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description taken in connection with the accompanying drawings in which:

FIGS. 7 and 8 are perspective and top plan views illustrating another embodiment of a quick disconnect arrangement incorporating the present invention wherein the retainer includes a spring biased member yieldably holding the insert in securement;

FIG. 9 is an enlarged sectional view of the releasable retaining means as taken in the direction of arrows 9—9 of FIG. 8;

DESCRIPTION OF PREFERRED EMBODIMENT

Figure 1:
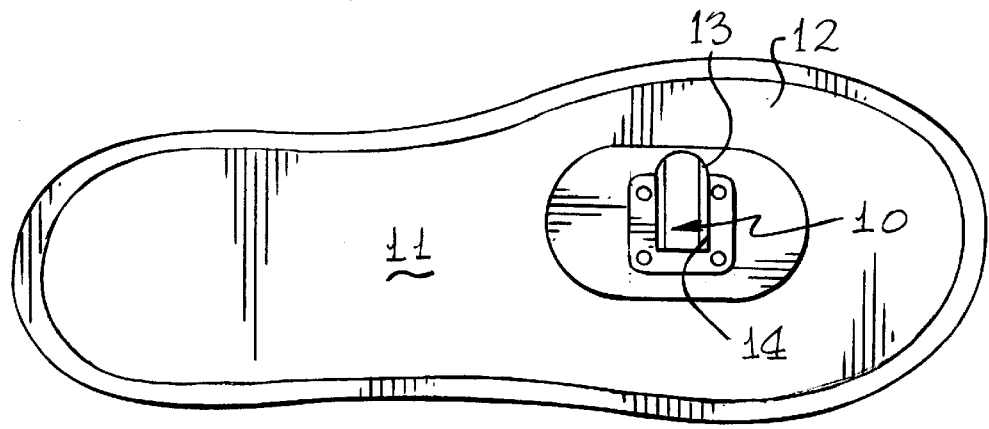
FIG. 1 is a bottom plan view of a shoe incorporating the insert, clip or key employed in the releasable retainer combination of the present invention.
Figure 2:
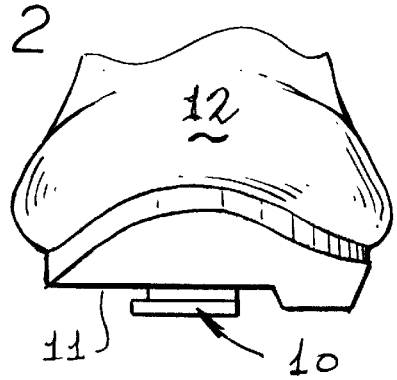
FIG. 2 is a front elevational view of the shoe shown in FIG. 1 illustrating a front elevational view of the insert, clip or key shown in FIG. 1.

Referring to FIGS. 1–6 inclusive, the novel quick disconnect and connect arrangement is illustrated in the general direction of arrow 9 for releasably engaging a shoe of a bike rider with a pedal 15. The shoe is identified by numeral 12 with the sole thereof indicated by numeral 11. The quick connect and disconnect arrangement 9 includes an insert, clip or key 10 secured to the underside or sole 11 of the shoe 12. The insert is rounded at its leading end 13 and includes a base 14 fixly secured to the sole 11.

Figure 3:
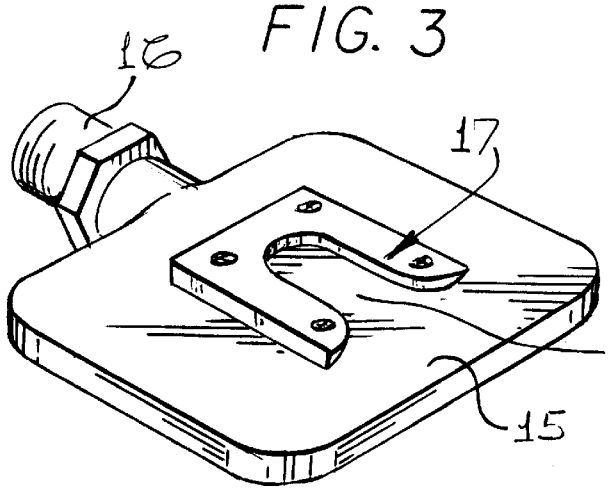
FIG. 3 is a front perspective view of a pedal having a slotted retainer carried thereon in order to insertably receive the insert, clip or key illustrated in FIGS. 1 and 2.
Figure 5:
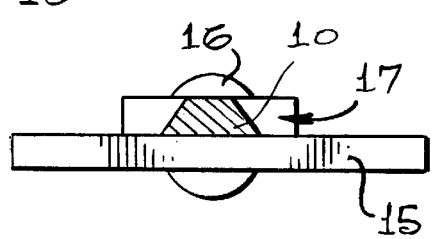
FIG. 5 is a front elevational view, partly in section, illustrating the insert, clip or key received within the slot of the retainer in order to releasably secure the shoe to the pedal.
Figure 4:
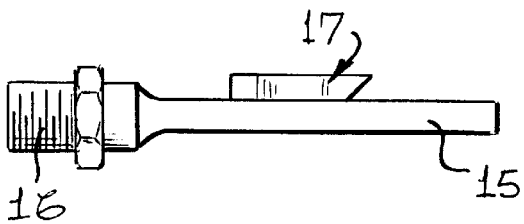
FIG. 4 is a front elevational view of the pedal and retainer shown in FIG. 3.
Figure 6:
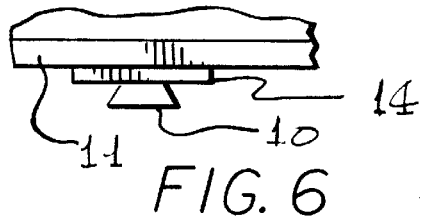
FIG. 6 is a front elevational view of the insert, clip or retainer illustrating the chamfered or tapered side thereof matable with the sidewall of the retainer on the pedal that defines the receiving slot.

FIGS. 3, 4 and 5 disclose the pedal 15 attached to a sprocket crank (not shown) by a threaded stud 16. A slotted retainer, receiver or keyway 17 is secured to the pedal and includes an open-ended slot 18 for insertably receiving the insert, clip or key 10. The opening to the slot is from the side away from the threaded stud 16 and the opening is rounded and enlarged so that a tapered side is established for ease of insertion of the insert, clip or key alignment with the slot. FIG. 5 illustrates the insert, clip or key 10 occupying the slot and illustrates conformity and mating of the dove-tail shape of the sidewalls of both the insert, clip or key and the defining sidewalls for the slot 18. The sides of the insert, clip or key are undercut to provide guidance in assembly and for alignment.

Therefore, it can be seen that the insertion of the clip or key 10 into the slot 18 is transverse or lateral from the side of the pedal. The direction of insertion is normal to the vertical axis of the pedal 15. The direction is substantially horizontal with respect to the upper surface of the pedal 15.

Referring now in detail to FIGS. 7 and 8, another version or embodiment of the invention is illustrated in the general direction of arrow 20 wherein it can be seen that a pedal 21 is cantilevered outwardly from a connection fixture 22 which is attached to the bicycle crank (not shown). The pedal 21 includes a base surface 23 on which is mounted a fixed member 24 and a movable member 25. The members 24 and 25 are spaced apart from one another so as to define a slot 26 between their opposing surfaces for insertably receiving a clip, insert or key 27 secured to the sole 11 of a shoe.

An alignment or guidance means is provided wherein the surface 23 is provided with a recess 28 so that when the rounded end 30 of the insert 27 is introduced to the slot 23, the insert will not be hung-up or impact against the end of the pedal. In a sense, the alignment of the insert with the slot is self-centering because of the slope provided on the recess 28. Also, it is to be noted that the ends 31 and 32 on the members 25 and 24 respectively are rounded so that the inserts 27 will self-align and be automatically be directed into the slot 26. An important feature of the version 20 resides in providing the member 31 with a pivoting action about a fastener 33 so that the slot may be expanded as the insert enters through the entrance defined by the opening between ends 31 and 32. The insert will proceed through the slot until a nub 34 drops into a indentation 35 in the insert 27. The nub 34 and indentation 35 form a detent for releasably and yieldably holding the insert into position between the members 24 and 25 in the slot 26. The member 25 will slightly pivot outwardly as the thickness of the insert is forced through the opening into the slot 26; however, once the insert has reached the end of the slot, the nub 34 will fall into the indentation 35 to releasably retain the insert in place.

The remainder of the shoe sole 11 will press against bars 36 and 37 respectively located on opposite sides of the pedal 21. The insert 27 may be fastened or secured to the sole of the shoe by means of screws or other fasteners which pass through openings such as opening 39.

In FIG. 8, it can be seen that the movable member 25 includes a hidden leaf-spring 40 which is fastened about the fastener 33 so that one end of the spring is restrained while the opposite end of the member is free to pivot in the direction of the arrow 41. The end of the member is directed or biased toward the slot 26 when the insert 27 is absent from the slot or when the nub 34 is fully received within the indentation 35 of the insert. The expanded or pivoted position of member 25 is shown in broken lines. The end of member 25 further includes a pin 42 that projects into an arcuate slot 44 and serves as a stabilizing means for the member 25 as its positions between its outer position in broken lines and its inner position against the insert 27.

Referring now in detail to FIG. 9, it can be seen that the insert 27 is carried on a base 45 and that the insert, clip or key downwardly depends from the base 45 and the sole 11. The insert terminates in an outwardly flared portion 48 which includes side surfaces which are tapered to provide a dove-tail alignment and engagement with the shaped sidewalls of the slot 26. The sidewall of each member defining the slot is tapered to match the dove-tail taper of the flared portion 48 of the insert.

Figure 10:
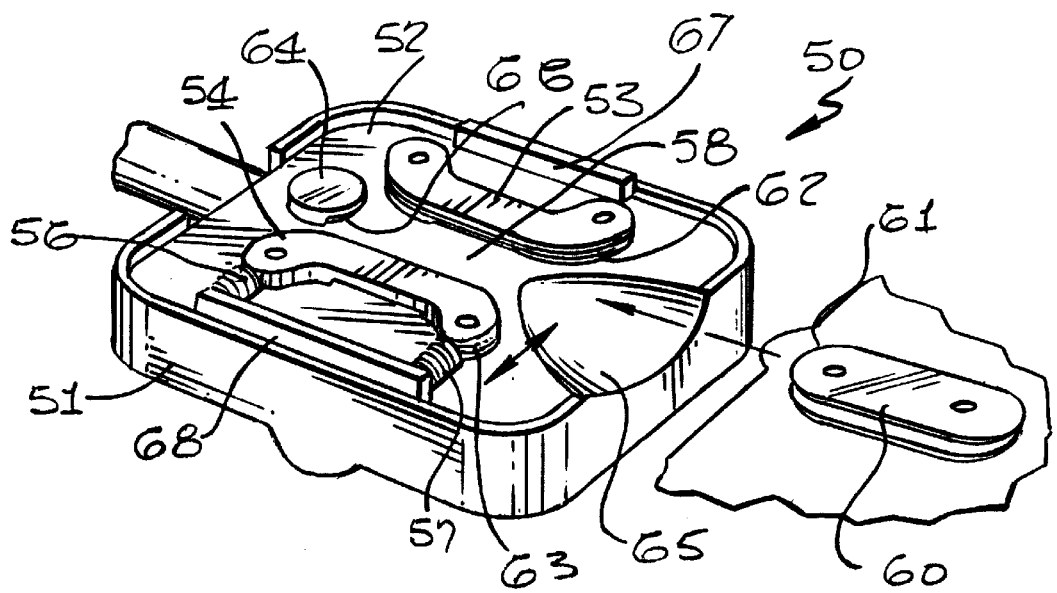
FIGS. 10 and 11 are views similar to the views of FIGS. 8 and 9 illustrating still another version of the present invention having a dual spring arrangement for yieldably biasing a leg member into connection with the insert carried on the shoe.
Figure 11:
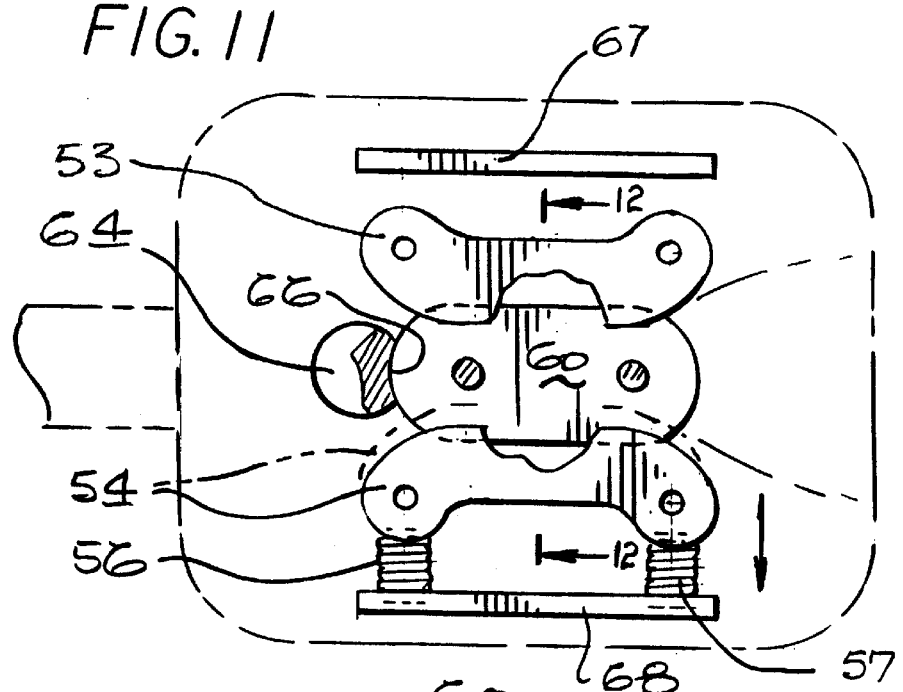

Referring now in detail to FIGS. 10 and 11, it can be seen that the novel quick connect and disconnect arrangement is illustrated in another embodiment by numeral 50 and that a pedal 51 includes a surface 52 on which is mounted a fixed member 53 and a movable member 54. The movable member is biased toward the fixed member 53 by means of a pair of spaced-part coiled springs 56 and 57 respectively. The springs operate to normally biased member 54 toward member 53 but the movement is limited so as to define a central elongated slot 58. A clip, insert or key 60 is rounded at end 61 and is inserted into the slot 58 via the rounded and enlarged entrance leading into the slot 58 by the ends 62 and 63 of the respective members 53 and 54. The movement of the insert 60 into slot 58 is limited by means of stop 64 which is at the extreme end of the slot between the members 53 and 54. Therefore, it can be seen that the member 54 moves forward and backwards to increase or decrease the distance between the members 53 and 54 and the width of slot 58. Also, it can be seen that the rounded ends 62 and 63 of the members provide a guide or an alignment means in combination with the recess 65 for receiving the rounded end of insert 60. It is also to be noted that the stop 64 includes an undercut shoulder 66 which covers the end of the insert 60 when it engages against the stop. Also, bars 67 and 68 provide surfaces against which the sole of the biker's shoe is placed once the insert 60 is in the slot 58 and retained therein.

Figure 12:
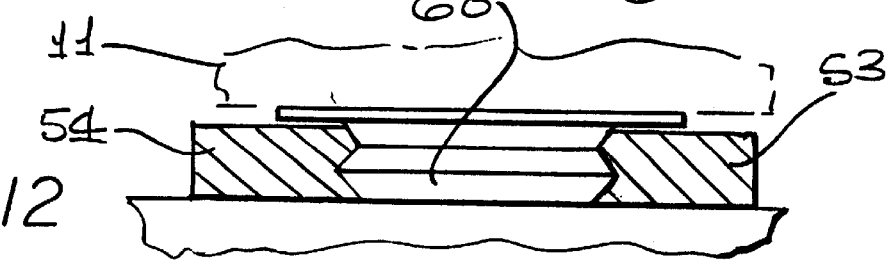
FIG. 12 is a transverse cross-sectional view of the inserted insert, clip or key in the receiving slot of the retainer as illustrated in the direction of arrows 12—12 of FIG. 11.

Referring now in detail to FIG. 11, it can be seen that the helical springs 56 and 57 are in fixed, spaced-apart relationship with one end of each spring bearing against bar 68 while the opposite end of the spring bears against the opposite end of the movable member 54. Also, in combination with FIG. 12, it can be seen that a similar or identical dove-tail relationship between the sides of the insert and the opposing sidewalls of the members 53 and 54 are the same as previously shown and described with respect to FIG. 9. The expanding pressure of the springs 56 and 57 maintain the insert 60 captured between the two members while the biker is pedaling. However, should there be an event where the rider or biker falls from the bike and his foot moves away from the pedal, the expansion pressure of the spring is overcome and the member 54 moves toward bar 68 to release the insert 60.

It view of the foregoing, it can be seen that the quick connect and disconnect arrangement of the present invention provides a safety means for a bike rider to not only permit engagement to increase the operating parameters for the cyclist but also provides a safety feature for automatically releasing the foot and shoe from the pedal should an accident occur requiring such disengagement. When a cyclist falls or collides, their body weight and twisting action causes the pivot arm or member to open the slot, thus ejecting the key or clip and the rider from the pedal. The cyclist's foot can turn in either direction to activate the pedal opening. The pedal base includes plate holes and member or arm undercut so that dirt and mud may fall through and accumulation is avoided. The sidebars are removable and the bars are raised for shoe support.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A quick disconnect arrangement for releasably coupling a cyclist's shoe with a bike pedal comprising:
   a bike pedal carried on a bike and having a foot engaging surface;
   a retainer secured to said foot engaging surface of said bike pedal and having an elongated slot having a closed end and an open end;
   a cyclist's shoe adapted to be worn by a cyclist and having a sole;
   an insert secured to said sole adapted to be insertably received into said slot via said open end;
   said closed end of said slot constituting a stop when engaged by said insert;
   said retainer includes a fixed member and a movable member in spaced apart relationship and said fixed member and said movable member having opposing sidewall defining said elongated slot with said open end laterally receiving insertion of said insert;
   means disposed on said sidewalls cooperating for preventing dislodgement of said insert from said retainer in a direction normal to said foot engaging surface;
   said insert having a wedge shape;
   said means for preventing dislodgement include said sidewalls having tapered walls matable with said wedge shaped insert;
   resilient means disposed between said movable member and said foot engaging surface for normally biasing said movable member towards said fixed member;
   said insert having a notch facing said movable member;
   said movable member having an outwardly lug engageable with said notch to releasably hold said insert in said slot;
   said resilient means is selected from:
   a. a pair of helical springs;
   b. a leaf spring;
   guide means disposed on said bike pedal for directing said insert through said open end into said slot; and
   said guide means includes said fixed member and said movable member having a pair of rounded ends defining said open end of said slot and further having a tapered recess immediately ahead of said open end provided in said foot engaging surface.

2. A quick disconnect apparatus for releasably engaging a cyclist's shoe with a bike pedal comprising:
   a bike pedal carried on a bike and having a foot engaging surface;
   a slotted retainer secured to said toot engaging surface of said bike pedal;
   a cyclist's shoe adapted to be worn by a cyclist and having a sole;
   an insert or key secured to said sole;
   said retainer having an elongated slot with an opening at one end thereof adapted to insertably receive said insert or key;
   said retainer includes a pair of opposing sidewalls in spaced-apart relationship defining said slot therebetween;
   said sidewalls defining a tapered dove-tail shape;
   said insert or key having a pair of opposite wall surfaces defining a wedge shape matable with said dove-tail shape of said retainer sidewalls to prevent release, separation or dislodgement of said insert or key from said retainer in a direction perpendicular or normal with respect to said foot engaging surface;
   said retainer's opposing pair of sidewalls constitute a fixedly secured member and a movable member;
   means disposed between said foot engaging surface and said movable member operable to normally urge said movable member towards said secured member;
   a notch provided on said insert and a detent nub provided on said movable member yieldably engageable with each other to releasably secure said insert or key with said movable member;
   said insert having a notch facing said movable member;
   said movable member having an outwardly projecting lug engageable with said notch to releasably hold said insert in said slot;
   guide means disposed on said bike pedal, for directing said insert through said open end into said slot; and
   said guide means includes said secured member and said movable member having a pair of rounded end portions defining said open end of said slot and further having a tapered recess immediately ahead of said open end provided in said foot engaging surface.

* * * * *